(No Model.)
D. T. MENELEY.
PLOW DISK.
No. 598,799.   Patented Feb. 8, 1898.
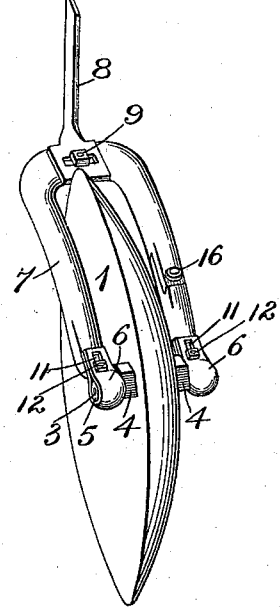
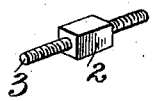
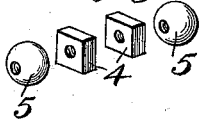
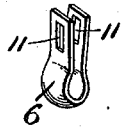
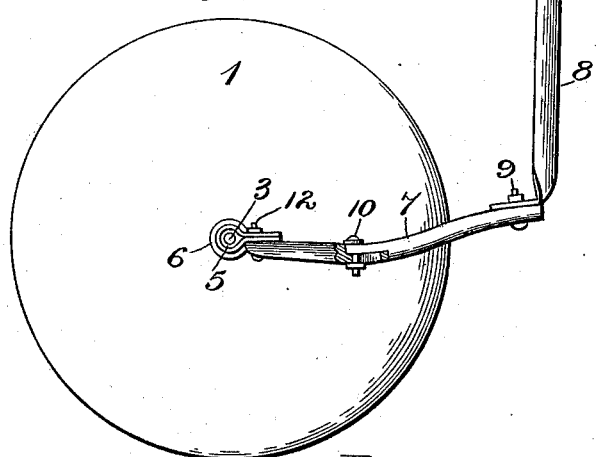
Witnesses
Edwin G. McKee
U. B. Hillyard
Inventor
Dennis T. Meneley
By his Attorneys,
C. A. Snow & Co.

UNITED STATES PATENT OFFICE.

DENNIS T. MENELEY, OF GREENFIELD, ILLINOIS.

PLOW-DISK.

SPECIFICATION forming part of Letters Patent No. 598,799, dated February 8, 1898.

Application filed April 14, 1897. Serial No. 632,160. (No model.)

*To all whom it may concern:*

Be it known that I, DENNIS T. MENELEY, a citizen of the United States, residing at Greenfield, in the county of Greene and State of Illinois, have invented a new and useful Plow-Disk, of which the following is a specification.

This invention aims to provide a disk cutter to replace the ordinary colter of a plow and to obviate the employment of the jointer-plow, both functions being performed by the improved means, which is a disk of concavo-convex form mounted so as to cut the sod and turn the same slightly in advance of the breaking-plow.

The invention consists in the means for mounting the disk, whereby its pitch can be regulated, and in the novel features and details of construction which hereinafter will be more particularly set forth, illustrated, and finally claimed.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of the invention. Fig. 2 is a side elevation thereof. Fig. 3 is a detail view of the axle. Fig. 4 is a detail view of the clamp-nuts and ball-bearings applied to the threaded ends of the axle. Fig. 5 is a detail view of a strap-bearing.

Corresponding and like parts are referred to in the following description and indicated in the several views of the drawings by the same reference characters.

The disk cutter 1 is concavo-convex or of dish form and has an angular opening to receive an angular portion 2 of the axle 3, the latter having its end portions threaded, the one being a right-hand and the other a left-hand thread. After the axle is placed in position a pair of nuts 4 are fitted upon its threaded extremities and clamp the disk cutter and secure it and the axle together. Ball-bearings 5 are mounted upon the threaded terminals of the axle and provide for the various adjustments of the disk cutter without creating any binding between them and the strap-bearings or boxes 6 at the extremities of the frame in which the disk cutter is mounted.

The frame 7 has adjustable connection at its front end with a standard 8, the latter having its lower portion bent and slotted and receiving a clamp-bolt 9, by means of which the frame and standard are secured when properly adjusted. The arms or side members of the frame curve downwardly and in the direction of their length to conform to the dish or curvature of the disk cutter in section, the outer arm being extensible to regulate the pitch of the disk cutter after the frame has been secured to the standard and the latter made fast to the plow-beam. The outer or extensible arm is composed of sections having their inner ends overlapping and slotted and held together by a clamp-bolt 10.

The strap or box bearings 6 are formed of strips of metal doubled upon themselves and having the folded part fashioned into a socket to receive a ball-bearing, the terminal portions being brought together and having slots 11, through which clamp-bolts 12 pass to secure the ends together and to the extremities of the arms or side members of the frame 7. The adjustable connection of the strap-bearings or boxes 6 with the arms of the frame 7 provides a means for adjusting the pitch of the disk cutter independent of the lengthening and shortening of the extensible arm. The disk cutter can be removed by taking off one of the nuts 4 and ball-bearings 5 from a threaded end of the axle, as will be readily understood. The disk cutter is attached to a plow-beam by means of the standard 8 in any of the usual ways of fastening a colter thereto and is set so as to cut the sod and turn the same in advance of the breaking-plow, thereby replacing the ordinary colter and pilot or jointer plow.

Having thus described the invention, what is claimed as new is—

1. In combination, a standard having its lower portion bent and slotted, a frame bearing a disk cutter, and means for adjustably connecting the frame with the slotted end of the standard, substantially as set forth.

2. In combination, a frame having an extensible arm or side member, and a disk cutter journaled to the extremities of the arms and operating in the space formed between them, substantially as set forth.

3. In combination, a frame comprising side members or arms, means for lengthening and shortening one of the arms and securing the parts when adjusted, an axle provided at its ends with balls forming bearings, boxes applied to the terminals of the aforesaid arms and receiving the balls of the axle, and a disk cutter mounted upon the axle and located in the space formed between the said arms, substantially as set forth.

4. In combination, a frame comprising arms, an axle, balls detachably fitted to the end portions of the axle and obtaining bearings in boxes provided at the extremities of the aforesaid arms, and a disk cutter mounted upon the axle to revolve therewith and operating in the space formed between the arms of the frame, substantially as specified.

5. In combination, a frame comprising arms, means for lengthening and shortening one of the arms, bearings having adjustable connection with the terminals of the arms, an axle having threaded end portions, a disk cutter secured to the axle midway of its extremities, and balls having screw-thread connection with the threaded ends of the axle and obtaining bearing in the boxes applied to the aforesaid arms, substantially as set forth.

In testimony that I claim the foregoing as my own I have hereto affixed my signature in the presence of two witnesses.

DENNIS T. MENELEY.

Witnesses:
 J. A. GIBSON,
 E. E. BURROUGHS.